United States Patent
McArdle et al.

[11] Patent Number: 5,259,987
[45] Date of Patent: * Nov. 9, 1993

[54] LIQUID CRYSTAL MATERIALS

[75] Inventors: Ciaran B. McArdle, Dublin, Ireland; Gary Nestor, Cambridge, England; George W. Gray, Cottingham, England; David Lacey, Hull, England

[73] Assignee: The General Electric Company, p.l.c., England

[*] Notice: The portion of the term of this patent subsequent to Feb. 27, 2007 has been disclaimed.

[21] Appl. No.: 793,796

[22] Filed: Nov. 18, 1991

Related U.S. Application Data

[63] Continuation of Ser. No. 391,190, Aug. 8, 1989, abandoned.

[30] Foreign Application Priority Data

Aug. 12, 1988 [GB] United Kingdom ............ 8819165.5

[51] Int. Cl.$^5$ ............ C09K 19/52; C09K 19/12; C08G 77/20; C08G 77/00
[52] U.S. Cl. .................... 252/299.01; 252/299.66; 252/299.61; 252/299.67; 528/32; 528/43
[58] Field of Search ............ 252/299.61, 299.01, 252/299.67, 299.66; 528/32.43

[56] References Cited

U.S. PATENT DOCUMENTS 4,904,066 2/1990 Gray et al. ............ 359/103 X
5,039,208 8/1991 Onishi et al. ............ 359/100

FOREIGN PATENT DOCUMENTS 0146120 11/1981 Japan .
3287823 11/1988 Japan .
1-211724 8/1989 Japan .

Primary Examiner—Robert L. Stoll
Assistant Examiner—C. Harris
Attorney, Agent, or Firm—Kirschstein, Ottinger, Israel and Schiffmiller

[57] ABSTRACT

Liquid crystal polymers, which may be used for optical information storage, either alone or in mixture with other liquid crystals, are of the general formula

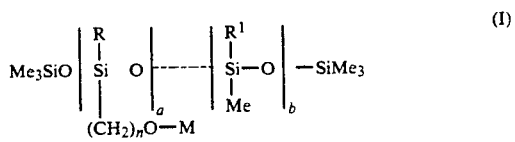

wherein the mesogenic grouping M has a general structure

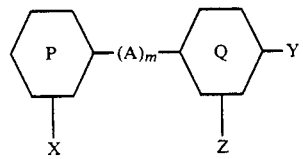

wherein the rings P and Q are selected from phenyl, trans-cyclohexyl, pyridyl, pyrimidinyl, dioxanyl, and bicyclo (2.2.2) octyl. The rings P and/or Q may carry lateral substituents, preferably Me or F. The general structure of Formula (I) may represent a homopolymer or a copolymer.

36 Claims, 2 Drawing Sheets

LIQUID CRYSTAL MATERIALS

This is a continuation of application Ser. No. 07/391,190 filed Aug. 8, 1989 now abandoned.

BACKGROUND OF THE INVENTION

1. Field of the Invention

This invention relates to side-chain liquid crystal polymers and to electro-optical devices using them.

2. Description of Related Art

Liquid crystal polymers combine the electro-optic characteristics of low molecular mass ('LMM') liquid crystals, for example with a molecular mass typically below 500 with the visco-elastic properties of polymers. In a manner analogous to LMM liquid crystals, liquid crystal polymers show nematic (N), cholesteric (Ch) and smectic (S) mesophases, but on cooling to lower temperatures experience a transition to a viscous or glassy state rather than to a solid crystalline state. In contrast with LMM liquid crystals, whereas the LMM liquid crystal - solid crystal transition destroys liquid crystalline order, the transition to a viscous or glass state stores it.

Liquid crystal side chain polymers consist of a polymeric backbone from which project mesogenic side groups. The backbone is normally flexible, to allow the side chains to adopt the order of the liquid crystal state, and may be wholly organic, for example a polyacrylate or polymethacrylate, or may be an organo-silicon chain, for example a polysiloxane chain. As with LMM liquid crystals, a wide variety of structures may be conceived for the mesogenic side groups, for example sequences of suitably-linked cyclic groups such as phenyl, cyclohexyl and heterocyclic rings.

Some typical liquid crystal polymer structures are described, for example, in the following references:

1. Anal. Chem. (1985), 57, 651–658.
2. Polymer (1985), 26, 1801–1806.
3. Polymer Communications, (1983), 24, 364–365.
4. Makromol, Chem (1985), 186, 2639–2647.
5. Polym. Sci. Technol (1985), 28 345–350.
6. Makromol Chem Rapid Commun (1985), 6, 57–63.
7. Makromol Chem Rapid Commun (1984), 3, 357–60.
8. Faraday Discuss. Chem. Soc. (1985), 79 paper 10.
9. Published UK Patent Application 2146787A.
10. Mol. Cryst. Liq. Cryst. (1985) 122, 205–218.

In electro-optical devices, liquid crystal polymers may be used in a number of ways, and a brief review is presented in ref. 8 above. Liquid crystal polymers may be used simply as additives to LMM monomeric liquid crystal materials, but their principal importance derives from the possibility of long-term durable storage of information encoded in the liquid crytalline state, for example in a device by effecting a transition to a liquid crystal state in an addressed area by local heating.

Optical storage in LMM liquid crystal materials is known. The commercially available smectic liquid crystal material S2, available from BDH Ltd., (UK) is an excellent optical storage medium, and is currently used as a standard for liquid crystal optical storage. S2 and LMM liquid crystal materials generally suffer from a number of disadvantages as far as optical storage is concerned, as follows:

1. stored information is often easily lost by mechanical stress.
2. the liquid crystal transition temperature is often inflexible,
3. the ease with which they may be homeotropically aligned makes writing of fine lines a problem, as the material springs back to its aligned form on cooling rather than giving a scattering line ('line shrinkage') so that resolution is limited at certain writing speeds,
4. grey scaling is often difficult.

There is clearly room for improvement even in S2, and some steps toward this have been taken, see, for example, Birecki et al, SPIE Proceedings 420 June 1983, p 194 (Ref: 11).

In liquid crystal polymers storage of the information may be accomplished in a number of ways. For example, U.S. Pat. No: 4,293,435 describes a device in which information may be encoded in a cholesteric texture of a liquid crystal polymer and stored by allowing the polymer to cool below its glass transition temperature (Tg). This device suffers from the disadvantages that Tg must be above normal ambient temperature (Ta, about 20° C.) and that the polymer may need to be heated as much as 100° C. above Ta for recording of information.

British Patent Specification No: 2,146,787A describes a device which uses a different effect, in which information is stored in a polymer in a viscous state above Tg and which persists over Ta. In such a device, at a temperature Tf (above Ta) a texture change occurs from an anisotropic but opaque state to a more fluid state which is highly birefringent and thus optically transmitting, and may also be aligned by a suitable electric field in a manner analogous to LMM liquid crystals (see FIG. 1). The degree of optical transmission increases with temperature in this fluid region until a temperature Tb, at which the isotropic phase begins to appear, and thereafter transmission drops until the clearing temperature TC is reached, at which the last of the birefringent structure disappears.

On heating the polymer to the vicinity of Tb, an optically transmitting state may be produced which is "frozen in" and stored when the temperature drops below Tf. In a device using such polymers Tg is less critical and may be below Ta, and less heating of the polymer is necessary.

Such devices may exploit the field alignment properties of N, Ch or S liquid crystal phases for storage purposes, but generally smectic polymers are preferred for better order and higher contrast. The quality of the display and the level of storage may be improved by, for example, the incorporation of pleochroic dyes, by laser addressing and by using birefringence effects, for example with crossed polarisers. Some such methods are described in Refs: 1 and 2 mentioned above.

Some efforts have been made to attempt to prepare mixtures of liquid crystal polymers and LMM liquid crystal materials, for example Ringsdorf et al *Makromol Chem Rapid Commun.* (1982) 3.745 (Ref: 12) reports on miscibility studies of nematic liquid crystal polymers with LMM liquid crystal materials. Miscibility problems were encountered, and no mention is made of the appearance of a biphasic region at Tb. Such mixtures could not have faster responses than the LMM nematic materials and could only offer advantages over nematic polymers. A similar, but rather inconclusive, study is reported in Ref: 8, discussing nematic non-storage applications of such mixtures.

SUMMARY OF THE INVENTION

It is an object of the present invention to provide novel liquid crystal polymers primarily but not exclusively for optical storage purposes, and novel optical storage liquid crystal mixtures and devices incorporating them.

To date, most of the liquid crystal polysiloxanes which have been produced have been based upon the structure:

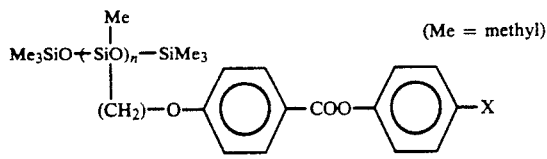

(Me = methyl)

where x is O-Alkyl or COO-Alkyl. This is for a number of reasons, among which is the historical reason that structures of this type are more likely to be nematogenic, and when X is CN cross linking is more likely to occur. Early attention was, as a consequence, therefore concentrated on nematic materials for use in fast-switching display devices. It is only comparatively recently that interest has shifted to material of smectic character for use in the durable storage devices discussed above.

Janini et al (Ref: 6) and Gemmel et al (Ref: 10) discuss some of the chemical factors that affect the properties of liquid crystal polymers, for example altering m in the structure shown above, i.e. to change the "spacer" length, or to dilute the mesogenic segments of the polymer chain with non-mesogenic segments to alter the relative degree of polymerisation and liquid crystal character. Their conclusions are that although trends may be observed, there is still much scope for experimentation to identify useful classes of liquid crystal polymer compounds.

According to the invention there is provided a group of liquid crystal polymers having the general formula:

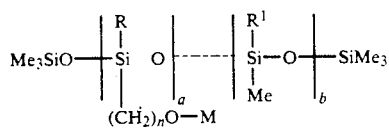

(I)

wherein the mesogenic grouping M has a general structure

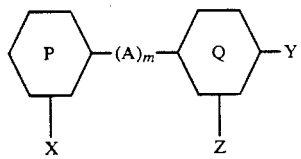

wherein the rings P and Q are selected from phenyl, trans-cyclohexyl, pyridyl, pyrimidinyl, dioxanyl, and bicyclo (2.2.2) octyl. The rings P and/or Q may carry lateral substituents, preferably Me or F.

The general structure above may represent a homopolymer or a copolymer.

(1) Homopolymers
  (i) b=0 and R=Me.
    Y is $R_1$, $OR_1$, Hal, $CF_3$, $Co_2R_1$, CN
    x and z may be selected independently from H and F such that always one at least of x, y and z is fluorine-containing (e.g. F, $CF_3$).

(ii) b=0 and R=$CH_2$Me.
    Y is $R_1$, $OR_1$, Hal, $CF_3$, $CO_2R_1$, CN
    x and z may be selected independently from H, Me and F.

(2) Copolymers
  b/a/<3 and >0
  R'=$(CH_2)_3$CN and R=Me
  Y is $R_1$, $OR_1$, Hal, $CF_3$, $CO_2R_1$, CN
  x and z may be selected independently from H, Me, Hal wherein n is an integer from 3 to 11
  wherein A is COO, OOC, $CH_2.CH_2$; m is 0 or 1
  wherein $R_1$ is alkyl, open chain or branched (including chiral alkyl) containing preferably 1 to 12 carbon atoms wherein the average degree of polymerisation $\overline{DP}$ is preferably in the range 10 to 120, especially 10 to 40 in the homopolymers in which R is $CH_2$Me and the copolymers in which R' is $(CH_2)_3$CN.

In the copolymers represented by Formula I, the differently substituted silicon atoms are randomly or substantially randomly distributed in the backbone structure. Formula I is therefore essentially schematic rather than being intended to represent a block copolymer.

The rings P and Q are preferably phenyl
$R_1$ is preferably n-alkyl containing 1-5 carbon atoms or is chiral alkyl containing 4-8 carbon atoms especially 2-methylbutyl or 1-methylheptyl.

Some prefered structures for the group M are listed below (Table 1).

TABLE 1

Homopolymers (R = Me)

(Ma) phenyl—COO—phenyl—F (Mb) phenyl—COO—phenyl—$CF_3$ (Mc) phenyl—COO—phenyl(F)—CN (Md) phenyl—COO—phenyl(F)—CN Homopolymers (R = $CH_2$Me)

(Me) phenyl—COO—phenyl—CN (Mf) phenyl—COO—phenyl(Me)—CN

TABLE 1-continued (Mg)

-⟨O⟩-COO-⟨O⟩-OMe (Mh)

-⟨O⟩-COO-⟨O⟩-COOCH₂CH(Me)(CH₂Me)

Copolymers (R' = (CH₂)₃CN) (R = Me)

(Mi)

-⟨O⟩-COO-⟨O⟩-OMe (Mj)

-⟨O⟩-COO-⟨O⟩-COOCH₂CH(Me)(CH₂Me)

(Mk)

-⟨O⟩-COO-⟨O⟩(Me)-CN (Ml)

-⟨O⟩-COO-⟨O⟩-CN

For the homopolymers with R=Me, the preferred $\overline{DP}$ is 35 to 50 For the homopolymers with R=CH₂Me, the preferred $\overline{DP}$ is 10 to 40 and for the copolymers with R'=(CH₂)₃CN and R=Me, the preferred $\overline{DP}$ is again 10 to 40 with the ratio b/a preferably about 1:1, e. g. between 1.4:1 and 1:1.4.

This ratio represents the ratio of the segments contributing polymeric character (b) to those contributing liquid crystal character (a).

A preferred range for n is 4-8. The length of the 'spacer' is one of the main factors determining the degree of decoupling between the mesogenic side groups and the polymeric chain. This, too, has an influence on the balance between polymeric and liquid crystal properties, and also on the appearance of smectic phases in the liquid crystal polymer. Although a trend observed in some cases is toward a more ordered system as the spacer length is increased, with generally an increase in Tc and a drop in Tg, there is much evidence that the spacer cannot be regarded simply as an inert structure used to decouple the motions of the backbone and mesogenic groups, but that its chemical nature has an influence on side group packing in the liquid crystal phases, and hence on mesophase range and stability.

The nature of the mesogenic group M will also have an effect on the proper-ties of the liquid crystal polymer. Generally speaking, groups wherein Y is CN favour the appearance of smectic phases. Increasing the complexity or the degree of conjugation of the group M tends to increase the thermal stability of liquid crystal phases. Terminal substituents Y which increase the length to breadth ratio of the group M generally raise Tc. When a lateral methyl substituent (Me) is present in M, then a short spacer, i.e. low n, may tend to destabilise the liquid crystal phases. It has often been observed that there is not necessarily any correlation between the types of liquid crystal phases shown by a liquid crystal polymer and by an LMM liquid crystal material containing the same mesogenic groups, a consequence of the greater ordering in the polymeric system.

The average degree of polymerisation $\overline{DP}$ is the average number of silicon atoms in the polymeric chain of Formula I, i.e. the average value of a+b. In a sample of a polymer which is not monodisperse γ=1) there will usually be a spread of $\overline{DP}$; suitable γ values range from 1.9 to 3.5.

The polydispersity (γ) is a measure of the distribution of polymer chain lengths in a bulk sample of the liquid crystal polymer. γ is defined as:

$$\gamma = \overline{Mw}/\overline{Mn}$$

where $\overline{Mw}$ is the weight-average molecular weight and $\overline{Mn}$ is the number-average molecular weight.

$$Mw = \frac{\int f(M) M^2 \cdot dM}{\int f(M) M \cdot dM}$$

and can be determined experimentally, for example by measurement of turbidity, and where $$Mn = \frac{\int f(M) MdM}{\int f(M) dM} = \frac{\text{weight}}{\text{No. of moles in sample}}$$

and may also be determined experimentally, for example by analysis of the number of end groups, and by osmotic pressure, cryoscopic or ebullioscopic methods.

γ influences the transition temperatures, and the sharpness with which transitions occur with changing temperatures, particularly for low $\overline{DP}$ polymers, as different liquid crystal polymer fractions exhibit phase transitions at different temperatures in samples containing less than about 50 siloxane units, Lower molecular weight fractions generally undergo phase transitions at lower temperatures than higher molecular weight fractions. For use in information storage applications such as the devices described above it is preferred that γ is greater than 1 but less than around 20, and samples with γ=1.9 to 3.5 have been found to be suitable.

A general method of preparation of the liquid crystal polymers of the invention is by means of the reaction between, for example a suitable poly-(hydrogen methyl/dimethyl) siloxane ("P(HM/DM)S") and a mesogenic terminal alkene in the presence of a suitable catalyst. This is represented schematically below:

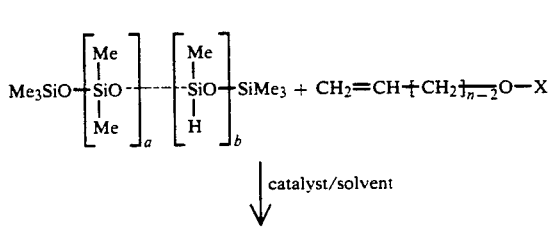

-continued

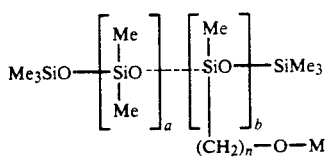

In this reaction, the overall silicone chain structure of the liquid crystal polymer, and such variables as the b : a ratio, $\overline{DP}, \gamma$ etc may be assumed to be those of the starting backbone. If the polymers of formula I are prepared using this general reaction it is therefore more convenient to measure these variables for the starting backbone than to attempt measurement of the properties of the end product polymer.

Many Si-H containing backbones are commercially available, for example from ICI, Dow or from the American company Petrarch, with manufacturer's specifications of these parameters. They may, however, be checked by the following methods, among others, so that the parameters of the product polymer of Formula I may be accurately known.

$^{29}Si$ nmr can be employed to provide information about the Si environment in the polymer. End group analysis of $^{29}Si$ nmr enables estimation of the number of —SiMe$_3$ termini in the material, hence the number of molecules in a sample, hence $\overline{Mn}$. The splitting of the $^{29}Si$ resonances of the non-terminal Si may be used to ascertain whether the polymer is, in fact, statistically random, and may also be used to determine the b:a ratio, i.e. by virtue of the different Si(HMe) and Si(Me)R environments. $^1H$ nmr may also be used for this purpose.

Determination of $\overline{DP}$ may be made by viscosity or preferably by GPC analysis of the starting backbone. Light scattering methods may be used to determine $\overline{Mw}$ of the backbone.

Other known methods may be used to determine $\overline{DP}$, $\overline{Mw}$, $\overline{Mn}$, and will be apparent to those skilled in the art.

It will therefore be apparent that all of the factors discussed above will act together in determining the balance between liquid crystalline and polymeric character of a liquid crystal polymer of the invention. The scope of the invention as defined herein therefore identifies a range of structural types of liquid crystal polymers with properties that render many members of the range useful for information storage purposes.

The liquid crystal polymers of the invention may be used in any of the ways discussed above.

They may, for example, be used as additives in known LMM liquid crystal materials. When used in this way they may usefully modify the elastic constants of the bulk LMM material, and the dielectric properties of the side groups may also modify the bulk dielectric properties of the LMM material. Such mixtures may also contain other compounds well known in the art to modify the dielectric anisotropy, to reduce melting point or viscosity, or to improve the multiplexibility or clearing point of the mixture. It is preferred that when used in this way the LMM liquid crystal material contains at least one compound having the same or a closely related mesogenic group, for example if in Formula I, M is:

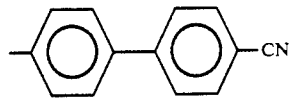

or

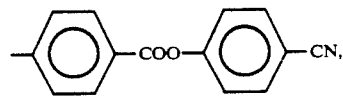

then a preferred LMM liquid crystal material contains compounds such as those described in British Patent No: 1,433,130, for example of general Formula II:

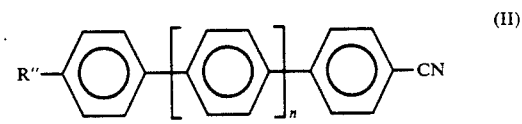

where n is 0 or 1 and R″ is alkyl or alkoxy. Compounds of formula II are a widely used class of LMM liquid crystal materials and they may be suitable for use in this way with liquid crystal polymers having a group X of any of the structures defined in Formula I.

Mixtures of this type are part of the invention insofar as they include a polymer of Formula I. They may be used in any of the known types of liquid crystal device which use the particular LMM material showing analogous liquid crystal phases.

The principal use of the liquid crystal polymers of the invention is in the electro-optical information storage devices of the type discussed above, and in particular in thermal or field addressed devices, such as those of U.S. Pat. No: 4,293,435 or British Patent Application No: 2,146,787A.

The liquid crystal polymers of the invention are especially suited to the device of the type described in British Patent Application No: 2,146,787A, as many of them show the series of transitions Tg—Tf—Tb—Tc with increasing temperature, Tg being below Ta. These transitions also often occur at temperatures which are convenient for thermal addressing by, for example, a focussed laser or incandescent lamp beam.

Using the polymers of the invention in such a device, i.e. containing a liquid crystal polymer as the bulk constituent, it has been found preferable to evaluate the temperature of the polymer in the thermal addressing step to above Tc rather than into the region Tb—Tc, i.e. into the isotropic region. Heating above Tc is found to improve the durability of stored information considerably.

When used in such a device the polymers may be used alone. Alternatively, their properties may usefully be modified, especially to increase Tf—Tg. This may be achieved by:

(i) Selecting polymers of lower molecular weight, although if the average molecular weight is less than about 3000 this may be accompanied by a lowering in viscosity of the viscous state.
(ii) Altering the polydispersity—this may also improve the sharpness of transitions.
(iii) Using a mixture of polymers of Formula I having different b:a, n, M, $\overline{DP}$, or $\gamma$.
(iv) Mixing the polymer or mixtures of polymers with LMM liquid crystal materials (preferably having the same mesogenic group), solvents or dyes, for example pleochroic dyes. The addition of such small molecules may substantially depress Tg without affecting the other transition temperatures.

Preferred pleochroic dyes are anthraquinone dyes, especially those available from BDH Ltd. as pure dye D16 or as sold in mixtures with liquid crystal materials such as D102. These are soluble in the liquid crystal polymers of the invention and show little tendency to crystallise. Other suitable pleochroic dyes include, for example, those described in British Patent No: 2,155,845, and the azo and anthraquinone dyes below:

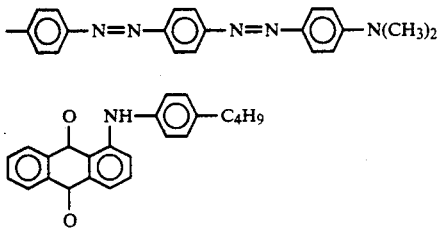

Concentrations of dye of around 2–4 wt% in the polymer have been found to be quite adequate.

In another, and particularly preferred use, polymers of formula I may be used in mixtures with LMM smectic liquid crystal optical storage materials, to obtain mixtures with improved properties relative to both the polymer and LMM material.

In accordance with this aspect of the invention, a material suitable for use as an optical storage medium comprises a mixture of at least two components, at least one of which is a LMM liquid crystal material which shows a smectic phase and at least one of which is a polymer of Formula I.

Many such LMM liquid crystal materials are known.

Preferred polymers of Formula I for use in the material of this aspect of the invention are those identified above as being generally suitable for optical storage, especially the preferred polymers of Formula I above, and particularly those which show smectic phases.

The smectic LMM liquid crystal material may be a single compound or a mixture of compounds. A general preferred class of compounds is represented by formula II where n is 0 or 1, and R" is n-alkyl or n-alkoxy containing 8 to 12 carbon atoms. Mixtures of this class of compounds are also preferred, for example S2 which has a composition:

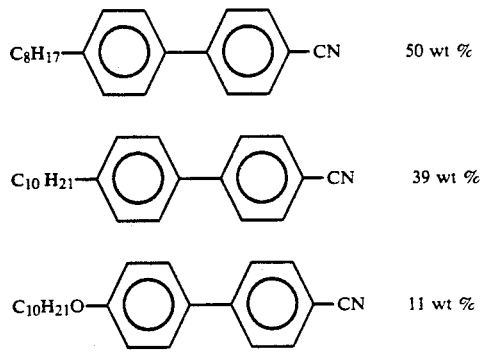

The smectic material may be one that shows optical storage properties by itself, or it may be one that only shows such properties when mixed with the polymer of Formula I.

The mixture may also contain other known additives to modify its properties, such as pleochroic dyes, for example the dyes referred to above, other LMM liquid crystal materials, for example the materials K24, K27, K30, K33, K36, S1, S3, S4, and S5 marketed by BDH Ltd., and may also contain other liquid crystal polymers e.g. of Formula 1.

Mixtures according to this aspect of the invention show the unexpected property that there appears to be in many cases no miscibility problem between the polymer and the LMM smectic material over the whole composition range, and that advantageous properties may be found in mixtures over the entire composition range. The mixture may therefore contain 1–99 wt% of either the polymer(s) or the LMM smectic material, the total being 100 wt% including any of the additives referred to above if present. Pleochroic dyes may, for example, be present to about 5 wt% or less, typically about 3%.

By varying the proportions of the polymer(s) of Formula I and the LMM smectic material, it is often possible to tune the appearance of the biphasic region, i.e. Tb, over a wide temperature range, for example in the case of S2/polymer mixtures between 48°–100° C. In this way an optical storage material of variable sensitivity to an addressing heat source, for example a laser beam, may be achieved.

Changing the proportions of the polymer(s) of Formula I and the LMM smectic material will affect the viscosity of the mixture, in effect plasticising the polymer(s) but increasing the viscosity of the LMM material. This enables the production of an optical storage liquid crystal material with less sensitivity to mechanical stress than the LMM material, but with a viscosity lower than that of the polymer(s) which enables easy filling of a device with the mixture.

As the electrical resistance behaviours of liquid crystal polymers and LMM materials are different, i.e. the resistance of a polymer generally rises to a maximum with increasing temperature, then falls to a value much lower than the value at ambient, but that of the LMM material gradually drops with increasing temperature across the smectic range, being lower at the S—N transition, and then falling rapidly in the nematic region, by judicious choice of the polymer and LMM smectic components of the mixture a material of advantageous electrical resistance may be obtained. Thus higher electrical fields may be used for faster selective and bulk erasure in optical storage without degradation of the material, fatigue due to continuous operation may be lessened by high resistivity materials, and large area devices may be made which could not be made using polymer liquid crystal storage materials alone.

The use of such mixtures may also alleviate, to some extent, the line shrinkage problem encountered with LMM liquid crystal storage materials.

Mixtures of this aspect of the invention may be used in any of the known types of liquid crystal optical information storage device for which LMM liquid crystal optical storage materials could be used. According, therefore, to a further aspect of the invention there is provided an electro-optic liquid crystal information storage device which uses a polymer of Formula I.

BRIEF DESCRIPTION OF THE DRAWINGS

The invention will now be described, by way of example only, with reference to the accompanying drawings in which.

DETAILED DESCRIPTION OF THE PREFERRED EMBODIMENT

Figure 1:
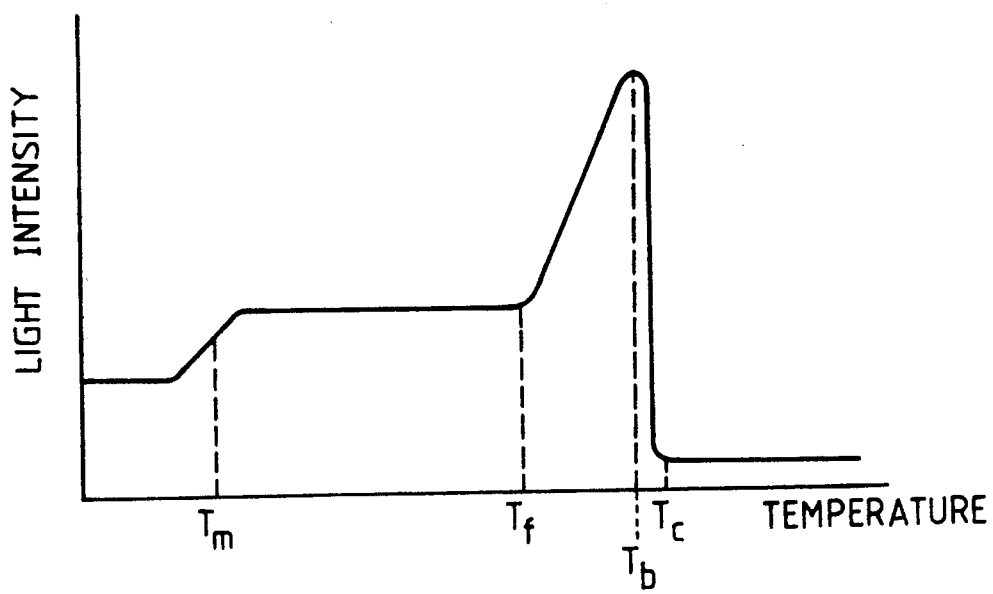
FIG. 1 shows a typical Thermo-Optical Analysis (TOA) trace for a liquid crystal polymer of the invention.
Figure 2:
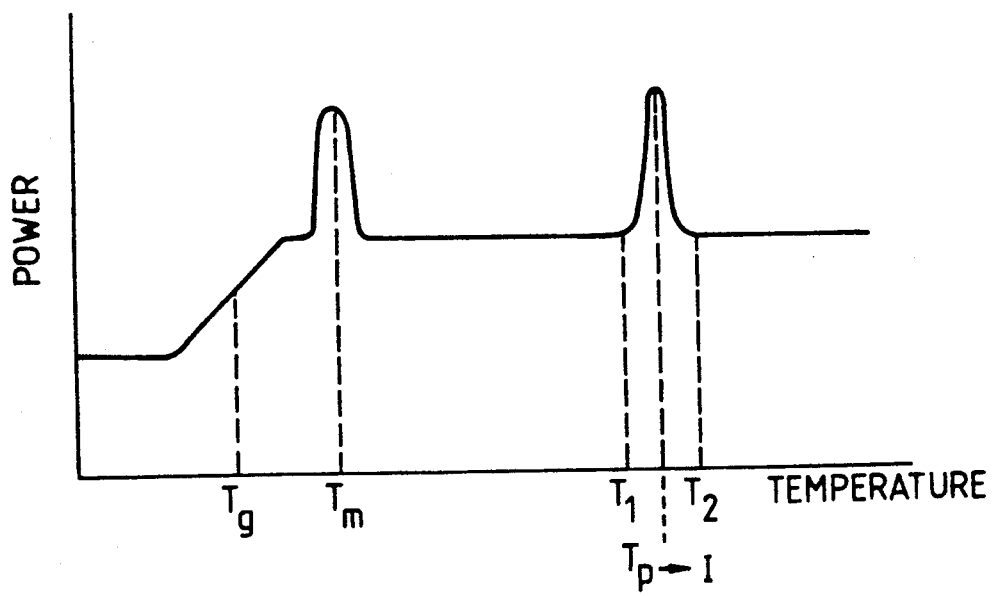
FIG. 2 shows a typical Differential Scanning Calorimetry (DSC) trace for a liquid crystal polymer of the invention.

Referring to FIGS. 1 and 2 of the drawings, the optical and thermal effects of changing the temperature of a polymer of the invention are shown. In these figures:

Tg = glass transition temperature.
Tm = melting temperature.
Tf = onset of fluid state.
$T_b$ = onset of biphasic state, at which an isotropic phase begins to appear.
$T_c$ = clearing temperature.
$T_{p\rightarrow I}$ = the temperature on the DSC trace corresponding to the peak maximum for transition from the liquid crystal phase to isotropic liquid. $T_1$ and $T_2$ are the start and finish of this transition, and therefore $T_2 - T_1$ represents the sharpness of this transition. $T_{S-I}$ is an equivalent term indicating a transition from a smectic state to the isotropic liquid.

Preparation of Liquid Crystal Polymer

The Si—H containing backbones used as precursors for the liquid crystal polymers of this invention prepared by the hydrosilylation reaction were obtained commerically and have the following structures, sources and physical characteristics.

Formula I Homopolymers

R = Me and b = 0

Backbone:

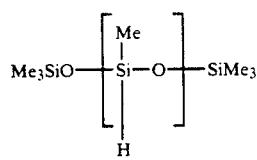
(III¹)

Sources: Dow DC 1107 and Wacker

Formula I Homopolymers

R = CH₂Me and b = 0

Backbone:

(III²)

Source: Petrarch PS128

Formula I Copolymers

R¹ = (CH₂)₃CN, R = Me

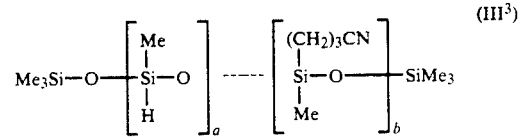
(III³)

Source: Petrarch PS124

Significant parameters for these backbone materials are given in Table 2.

TABLE 2

| Source | Backbone Structure | GPC* | | | ¹Hnmr** | | |
|---|---|---|---|---|---|---|---|
| | | $\bar{M}w$ | $\bar{M}n$ | $\bar{M}w/\bar{M}n$ | $\bar{M}n$ | $\overline{DP}$ | ratio b/a |
| Dow DC1107 | III¹ | 9950 | 3100 | 3.2 | 2560 | 40 ± 3 | — |
| Wacker | III¹ | 8050 | 3550 | 2.3 | 2920 | 46 ± 3 | — |
| Petrarch PS128 | III² | 2480 | 710 | 3.4 | 2010 | 25 ± 3 | — |
| Petrarch PS124 | III³ | ND | ND | ND | 2660 | 26 ± 3 | 1.17:1 |

* GPC analysis made using solutions in toluene on PL gel; 30 cm column with 10 μm packing (10³–10⁵ Å), ambient temperature, flow rate 1 ml min⁻¹. Calibration was based on a third order polynomial expression to give polystyrene-equivalent molecular weights.
** End group analytical values obtained by nmr spectroscopy represent an average of 5 integrations.
ND No detector response from GPC analysis.

The mesogenic terminal alkenes were prepared either by literature routes or by methods familiar to those skilled in organic synthesis. For example:

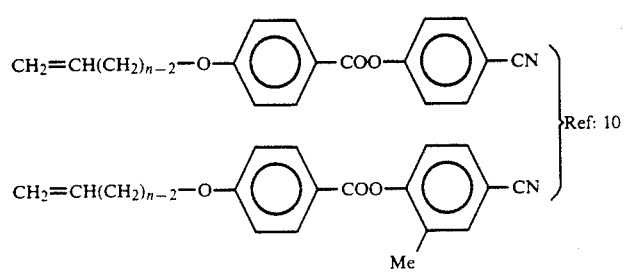
Ref: 10

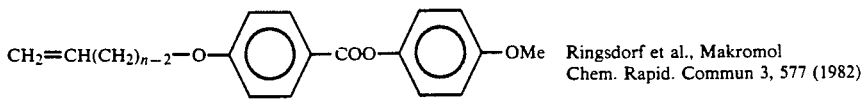

Ringsdorf et al., Makromol Chem. Rapid. Commun 3, 577 (1982)

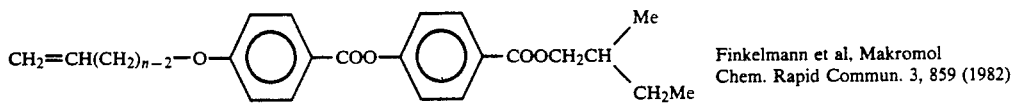

Finkelmann et al, Makromol Chem. Rapid Commun. 3, 859 (1982)

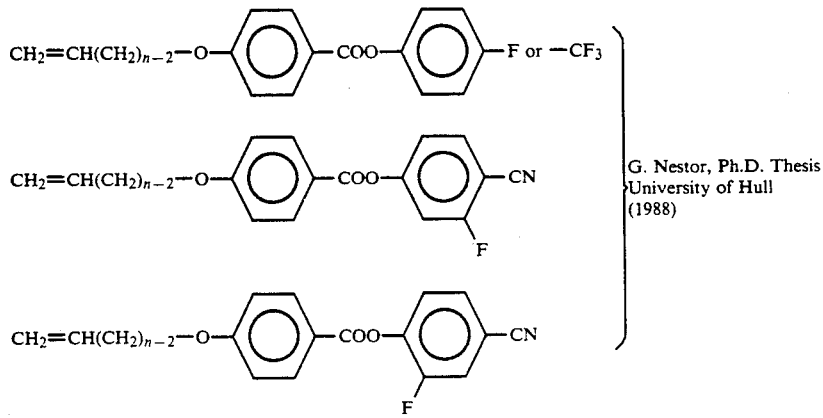

G. Nestor, Ph.D. Thesis University of Hull (1988)

To a mixture of the appropriate backbone (III$^1$, III$^2$ or III$^3$) (0.6 g, 4.5 mmol (Si-H) and the side chain alkene (4.94 mmol, 10% excess) in dry toluene (60 ml), the freshly prepared catalyst H$_2$PtCl$_6$ (Spaier's Catalyst) in solution in toluene was added to give a Pt:alkene ratio of between 1:10$^3$ and 1:10$^6$ (the quantity depending upon the mesogenic side chain being used). The whole procedure was carried out in a nitrogen atmosphere.

The mixture was then heated under reflux for about 36 hours or until no SiH absorption at 2140 cm$^{-1}$ was detectable by IR spectroscopy, whichever period was the shorter. In cases where a significant Si-H absorption still remained after 36 hours, oct-1-ene was added to the reaction mixture, in a two molar excess (based upon the original Si-H concentration) to mop-up the small amount of remaining Si-H sites and prevent cross-linking during work-up. The reaction mixture was then heated under reflux for a further 2 hours.

The polymer was then isolated by precipitation with methanol and subsequent centrifugation. Purification of the polymer was achieved by precipitating the polymer several times from dichloromethane by the additon of methanol.

Having prepared the polymers in this way it was found to be highly desirable to remove traces of the mesogenic terminal alkene. Generally 6 to 10 precipitations from dichloromethane were found to be adequate to achieve this.

The polymers were dried as the isotropic melt under vacuum (below 0.5 mm Hg) to remove all traces of solvents. Drying was considered complete when constant transition temperatures were observed. Yields of polymers were generally about 40-50% by weight.

Full details of the hydrosilylation procedure are to be found in the following papers —G. W. Gray, D. Lacey, G. Nestor and M. S. White, Makromol Chem., Rapid Commun. 7, 71 (1986); G. Nestor, M. S. White, G. W. Gray, D. Lacey, and K. J. Toyne, Makromol Chem., 188, 2759(1987).

Due to difficulties in dissolving the backbone (III$^3$) in toluene, α, α, α-trifluorotoluene (50 ml) was used as the reaction solvent for the preparation of the related polymers of Formula I, i.e. the copolymers with R$^1$=(CH$_2$)$_3$CN and R=Me -see also G. Nestor, Ph.D Thesis, Hull University, 1988.

In the case of the backbone (III$^2$), significant amounts of unreacted Si-H remained when the reaction with alkene had apparently ceased. This amount varied from batch to batch, and resulted in variable uptake of oct-1-ene in the mop-up procedures. As a consequence, batch variations in transition temperatures arose for the polymers (see Table 3).

Some properties of polymers prepared (Table 3) by these methods from the backbones (III$^1$, III$^2$, and III$^3$) are listed below (Table 4).

TABLE 3

| Polymer Identification | | | | |
|---|---|---|---|---|
| M | n | Backbone | b/a | Code |
| ⟨○⟩-COO-⟨○⟩-F | 5 | III$^1$ | 0 | 1 |
|  | 6 | III$^1$ | 0 | 2 |

TABLE 3-continued

| M | n | Backbone | b/a | Code |
|---|---|---|---|---|
| Ph-COO-Ph-CF$_3$ | 5 | III[1] | 0 | 3 |
|  | 6 | III[1] | 0 | 4 |
| Ph-COO-Ph(F)-CN | 5 | III[1] | 0 | 5 |
|  | 6 | III[1] | 0 | 6 |
| Ph-COO-Ph(F)-CN | 5 | III[1] | 0 | 7 |
|  | 6 | III[1] | 0 | 8 |
| Ph-COO-Ph-CN | 5 | III[2] | 0 | 9 |
|  | 6 | III[2] | 0 | 10 |
| Ph-COO-Ph(Me)-CN | 8 | III[2] | 0 | 11 |
| Ph-COO-Ph-OMe | 6 | III[2] | 0 | 12 |
| Ph-COO-Ph-COOCH$_2$CH(Me)CH$_2$Me | 6 | III[2] | 0 | 13 |
| Ph-COO-Ph-CN | 5 | III[3] | 1.17:1 | 14 |
|  | 6 | III[3] | 1.17:1 | 15 |
| Ph-COO-Ph-OMe | 6 | III[3] | 1.17:1 | 16 |
| Ph-COO-Ph(Me)-CN | 8 | III[3] | 1.17:1 | 17 |
| Ph-COO-Ph-COOCH$_2$CH(Me)CH$_2$Me | 6 | III[3] | 1.17:1 | 18 |

TABLE 4

DSC Data (in °C. and Jg$^{-1}$, scanning rate 10° C. min$^{-1}$)

| Polymer Code | Tg | Tm | S$_B$-S$_A$ | SA-I | N-I | ΔCp of Tg | ΔHTm | ΔHS$_B$-S$_A$ | ΔHS$_A$-I | ΔH$_N$-I |
|---|---|---|---|---|---|---|---|---|---|---|
| 1 | — | — | — | 154 | — | — | — | — | 10.2 | — |
| 2 | — | 56 | — | 132 | — | — | 10.6 | — | 7.3 | — |
| 3 | — | 105 | 113 | 204 | — | — | 10.1* | —⁺ | 10.6 | — |
| 4 | — | 95 | 99 | 185 | — | — | 9.2* | —⁺ | 11.0 | — |
| 5 | 6 | 46 | — | 156 | — | 0.2 | 2.5 | — | 2.9 | — |
| 6 | 0 | — | — | 139 | — | 0.3 | — | — | 2.7 | — |
| 7 | — | 88 | — | 119 | — | — | 8.5 | — | 2.6 | — |
| 8 | 19 | 46 | — | 118 | — | 0.2 | 5.1 | — | 2.4 | — |
| 9 | 8 | 47 | — | 124 | — | 0.1 | 3.6 | — | 2.4 | — |
| 10a | 3 | — | — | 116 | — | 0.4 | — | — | 2.6 | — |
| 10b | 4 | — | — | 120 | — | 0.3 | — | — | 2.8 | — |
| 11a | −3 | — | — | 68 | — | 0.2 | — | — | 3.0 | — |
| 11b | 1 | — | — | 80 | — | 0.2 | — | — | 2.3 | — |
| 12a | −3 | — | — | — | 71 | 0.1 | — | — | — | 1.4 |
| 12b | −5 | — | — | — | 66 | 0.2 | — | — | — | 1.4 |
| 13 | −13 | 43 | — | 43** | — | 0.1 | *** | — | *** | — |

| | Tg | Tc# | ΔCp of Tg | ΔHTc |
|---|---|---|---|---|
| 14 | −12 | 31 | 0.2 | 1.1 |
| 15 | −11 | 28 | 0.2 | 1.4 |
| 16 | −16 | — | 0.2 | — |
| 17 | −23 | — | 0.2 | — |
| 18 | −23 | — | 0.2 | — |

*overlap of adjacent peaks; includes ΔHS$_B$-SA
⁺value unavailable - see footnote *
Phase type not yet assigned
**Phase appears to be Sc in this case
***Value not available through coincidence of transitions A method for reducing the viscosity of the material comprises plasticising the liquid crystal polymer with a low molar mass material, such as the smectic A material S2, mentioned above.

Figure 3:
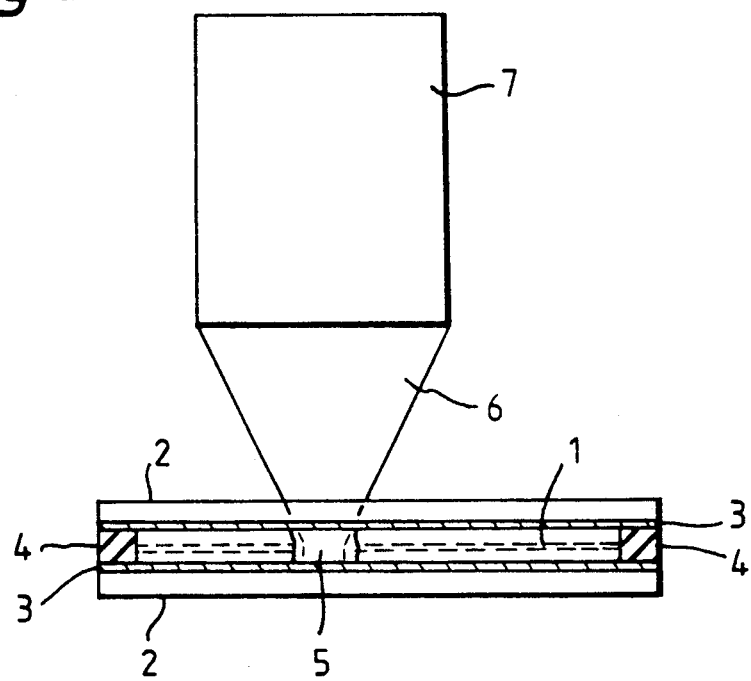
FIG. 3 shows a cross section of an electro-optical information storage device suitable for use with a liquid crystal polymer of the invention.

FIG. 3 shows an electro-optic device suitable for use with liquid crystal polymers of the invention and mixtures containing them which have optical storage properties. The polymer or mixture is contained as a thin film 1 in a cell defined by two glass plates 2 on the inner surface of which are deposited transparent conducting films 3 of indium/tin oxide. Spacers 4 define the film thickness of about 10-30 microns, and this may also be assisted by putting glass fibres (not shown) of known width in the cell cavity. The conducting films 3 may uniformly cover the whole inner surface of the plates 2 or may be etched into a suitable pattern, for example dots or a seven segment display. Regions 5 of the film may be thermally addressed by a focussed beam 6 from a laser 7. By means of appropriate optics and beam directing systems (not shown) the beam 6 may be moved around to focus on other regions of the film 1, so as to write information thereupon.

In use with a liquid crystal polymer according to the invention, field induced alignment of a region 5 of the polymer occurs when an electric field of sufficient strength is applied via the conducting films 3 if the region of polymer 5 is heated to a temperature above Tc by the beam 6. This alignment is durable on cooling, but less effective alignment and less durability may alternatively be achieved by heating into the range Tf to Tc.

The aligned texture in the region 5 may be stored with the applied field removed, at temperatures below Tf. In the unaligned state the polymer 1 is opaque and provides minimal light transmission, whilst the field aligned stored textures is optically isotropic and appears transparent. Alternatively, the polymer 1 may be aligned by heating in the presence of an aligning field and allowing it to cool, so storing a transparent texture over the whole of the polymer, and the regions 5 may have opaque unaligned texture durably written into them by heating above Tc in the absence of an aligning field.

The stored texture may be erased either by heating the whole polymer film 1 above Tc and cooling in the presence of an aligning field, or by changing the electric field parameters, for example its frequency, direction or any combination thereof.

In a typical device constructed and used as described above, the polymer 1 was used with the pleochroic dyes mentioned above. A HeNe laser operating in a continuous wave mode at 633 nm was used with appropriate focussing and directing optics. The power required for writing, measured at the sample plane, is typically 5-10 mw at room temperature, and sample sensitivities of approximately 12 nj μm$^{-2}$ have been calculated.

In one addressing mode used for non-scanning experiments, a single laser source has been used to gather all the information for write, read, selective erase, grey scale, bulk erase and fatigue testing. This mode employs an analogue driven acousto-optic modulator to provide a low (sub writing threshold) probe beam for reading and uses higher energy pulses for writing. In the positive contrast writing (i.e. opaque scattering textures on a clear background) a 75-80% decrease in the read channel signal could be achieved on spot formation using 100-300 μs writing pulses. The read level is restored by selective erasure with the same pulse width and laser power applied in conjunction with a field. Bulk erasure, i.e. use of an electric field only to erase written information, was also demonstrated at room temperature and at elevated temperatures.

Fields of 60-100 Vrms and less at 3 KHz sinewave were more than sufficient to align 10 μm thick samples when the polymers were cooled with the field from the molten state. These fields were lower than those reported in Ref: 8.

In the device described and illustrated, grey scaling may be achieved in the positive contrast mode, i.e. where unaligned opaque texture is written into a background of aligned transparent texture by heating the region 5 to a temperature above Tc and allowing it to cool in the presence of an electric field which is insufficient to re-align the addressed region wholly, but sufficient only to re-align it partly. Alternatively, grey scaling can be performed in the writing step by using shorter write pulses of constant energy, or laser pulses of the required length but of lower energy.

An optical storage device can be produced with a scattering background on which lines are written which have a different texture from the background, due to the rapid quenching of the liquid crystal polymer in the lines.

The homopolymers Ma to Mh of Table 1 exhibit a flow-aligned texture within a laser-written line. The flow alignment produces a director alignment parallel to the direction of scanning of the laser, and the line becomes a λ/2 wave plate. This effect can be used to produce colour displays as described in Patent Application No: 880766.5 Alternatively, it can be used in polarisation switches, since the polarisation will depend on the direction of scanning of the laser. The flow alignment within a laser-written line is produced when the background is aligned, for example by an electric field, and when the background is scattering.

It has also been observed that an isotropic texture is obtained after bulk heating of spun coated thin films of these polymers has been effected. This property might be useful in optical storage applications, even though the background is unaligned.

These polymers can also be used as poled matrices for non-linear optical dyes. The polymer Mh of Table 1 exhibits a ferroelectric smectic C* phase. When poled, this could be particularly useful as a non-centrosymmetric matrix for non-linear optical dyes for the production of easily-processed second order non-linear optical materials.

We claim:

1. A liquid crystal polymer having the general formula:

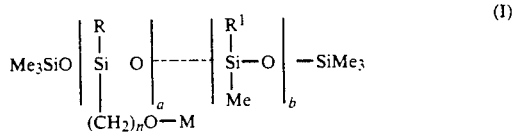

(I)

wherein the mesogenic grouping M has a general structure

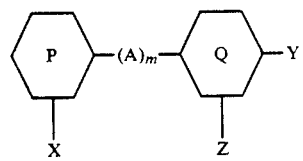

wherein the rings P and Q are selected from phenyl, trans-cyclohexyl, pyridyl, pyrimidinyl, dioxanyl, and bicyclo (2.2.2) octyl;
wherein the structure of formula I represents a homopolymer;
wherein b=0 and R=Me;
wherein Y is R, $OR_1$, Hal, $CF_3$, $CO_2R_1$ or CN;
wherein $R_1$ is alkyl, open chain or branched, containing 1–12 carbon atoms;
wherein A is COO, OOC or $CH_2.CH_2$;
wherein m is 0 or 1; and wherein X and Z are selected independently from H and F such that one at least of X, Y and Z contains fluorine.

2. A liquid crystal polymer as claimed in claim 1, wherein the ring P and/or the ring Q carries lateral substituents.

3. A liquid crystal polymer as claimed in claim 1, having a polydispersity γ which lies between 1 and about 20.

4. A liquid crystal polymer as claimed in claim 3, having a polydispersity γ which lies between 1.9 and 3.5.

5. A liquid crystal material comprising a mixture of a liquid crystal polymer as claimed in claim 1 and a low molar mass (LMM) liquid crystal material.

6. A liquid crystal material as claimed in claim 5, wherein the LMM liquid crystal material exhibits a smectic phase.

7. A liquid crystal material as claimed in claim 6, wherein the LMM liquid crystal material contains compounds of formula II, as follows:

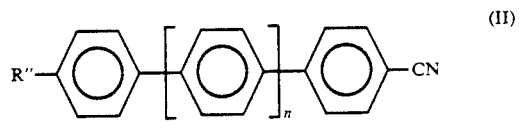

wherein n is 0 or 1; and
wherein R" is alkyl or alkoxy containing 1–12 carbon atoms.

8. A liquid crystal material as claimed in claim 7, wherein the LMM liquid crystal material contains

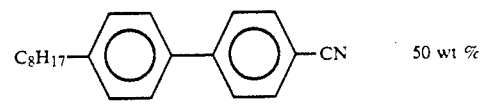

50 wt %

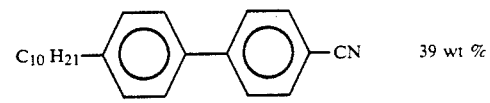

39 wt %

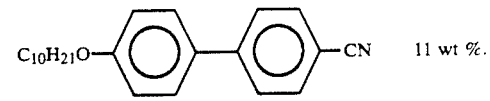

11 wt %.

9. A liquid crystal material as claimed in claim 5, further comprising a pleochroic dye.

10. A liquid crystal material as claimed in claim 9, wherein the dye is an anthraquinone dye.

11. A liquid crystal polymer having the general formula:

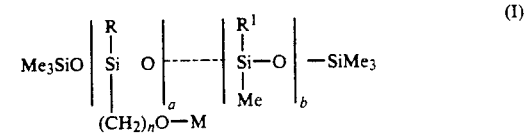

(I)

wherein the mesogenic grouping M has a general structure

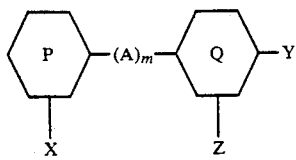

wherein the rings P and Q are selected from phenyl, trans-cyclohexyl, pyridyl, pyrimidinyl, dioxanyl, and bicyclo (2.2.2) octyl;

wherein the structure of formula I represents a homopolymer;

wherein n is an integer from 3 to 11;

wherein b=0 R=CH$_2$Me;

wherein Y is R$_1$, OR$_1$, Hal, CF$_3$, CO$_2$R$_1$ or CN;

wherein R$_1$ is alkyl, open chain or branched, containing 1–12 carbon atoms;

wherein A is COO, OOC or CH$_2$.CH$_2$;

wherein m is 0 or 1; and wherein X and Z are selected independently from H and F.

12. A liquid crystal polymer as claimed in claim 11, wherein the ring P and/or the ring Q carries lateral substituents such as Me or F.

13. A liquid crystal polymer as claimed in claim 11, having a polydispersity $\gamma$ which lies between 1 and about 20.

14. A liquid crystal material comprising a mixture of a liquid crystal polymer as claimed in claim 11 and a low molar mass (LMM) liquid crystal material.

15. A liquid crystal material as claimed in claim 14, wherein the LMM liquid crystal material exhibits a smectic phase.

16. A liquid crystal material as claimed in claim 15, wherein the LMM liquid crystal material contains compounds of formula II, as follows:

wherein n is 0 or 1; and wherein R" is alkyl or alkoxy containing 1–12 carbon atoms.

17. A liquid crystal material as claimed in claim 16, wherein the LMM liquid crystal material contains

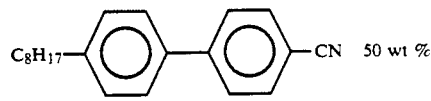

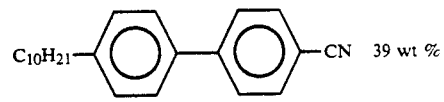

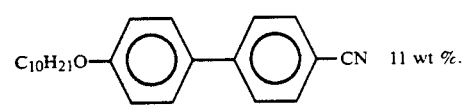

18. A liquid crystal material as claimed in claim 14, further comprising a pleochroic dye.

19. A liquid crystal material as claimed in claim 18, wherein the dye is an anthraquinone dye.

20. A liquid crystal polymer having the general formula:

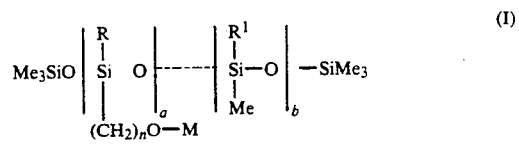

wherein the mesogenic grouping M has a general structure

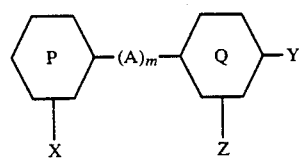

wherein the rings P and Q are selected from phenyl, trans-cyclohexyl, pyridyl, pyrimidinyl, dioxanyl, and bicyclo (2.2.2) octyl;

wherein the structure of formula I represents a copolymer;

wherein b/a<3 and >0;

wherein R$^1$=(CH$_2$)$_3$CN and R=Me;

wherein Y is R$_1$, OR$_1$, Hal, CF$_3$, CO$_2$R$_1$ or CN;

X and Z are selected independently from H, Me and Hal;

wherein n is an integer from 3 to 11;

wherein A is COO, OOC or CH$_2$.CH$_2$;

wherein m is 0 or 1; and wherein R$_1$ is alkyl, open chain or branched, containing 1–12 carbon atoms.

21. A liquid crystal polymer as claimed in claim 20, wherein the ring P and/or the ring Q carries lateral substituents such as Me or F.

22. A liquid crystal polymer as claimed in claim 20, having a polydispersity $\gamma$ which lies between 1 and about 20.

23. A liquid crystal material comprising a mixture of a liquid crystal polymer as claimed in claim 20 and a low molar mass (LMM) liquid crystal material.

24. A liquid crystal material as claimed in claim 23, wherein the LMM liquid crystal material exhibits a smectic phase.

25. A liquid crystal material as claimed in claim 23, wherein the LMM liquid crystal material contains compounds of formula II, as follows:

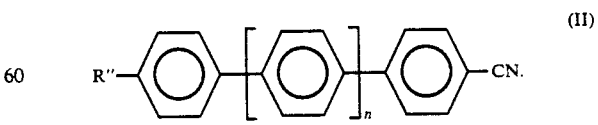

wherein n is 0 or 1; and wherein R" is alkyl or alkoxy containing 1–12 carbon atoms.

26. A liquid crystal material as claimed in claim 25, wherein the LMM liquid crystal material contains C₈H₁₇—⌬—⌬—CN  50 wt %

C₁₀H₂₁—⌬—⌬—CN  39 wt %

C₁₀H₂₁O—⌬—⌬—CN  11 wt %.

27. A liquid crystal material as claimed in claim 23, further comprising a pleochroic dye.

28. A liquid crystal material as claimed in claim 27, wherein the dye is an anthraquinone dye.

29. A liquid crystal polymer as claimed in claim 20, having an average degree of polymerization in the range 10 to 120.

30. A liquid crystal polymer having the general formula:

$$Me_3SiO \left[ \begin{array}{c} R \\ | \\ Si-O \\ | \\ (CH_2)_nO-M \end{array} \right]_a \left[ \begin{array}{c} R^1 \\ | \\ Si-O \\ | \\ Me \end{array} \right]_b -SiMe_3 \quad (I)$$

wherein the mesogenic grouping M has a general structure

⬡P—(A)ₘ—⬡Q—Y
 |              |
 X              Z wherein the rings P and Q are selected from phenyl, trans-cyclohexyl, pyridyl, pyrimidinyl, dioxanyl, and bicyclo (2.2.2) octyl;
wherein n is an integer from 3 to 11;
wherein b/a < 3 and > 0;
wherein Y is $R_1$, $OR_1$, Hal, $CF_3$, $CO_2R_1$ or CN;
wherein X and Z are selected independently from H, Me and Hal;
wherein $R_1$ is alkyl, open chain or branched, containing 1-12 carbon atoms;
wherein R = Me and $R^1 = (CH_2)_3CN$; and
wherein the group M is selected from structures (Ma) to (Md) as follows:

(Ma) —⌬—COO—⌬—F (Mb) —⌬—COO—⌬—CF₃

(Mc) —⌬—COO—⌬(F)—CN (Md) —⌬—COO—⌬(F)—CN.

31. A liquid crystal polymer as claimed in claim 30, having an average degree of polymerization of 35 to 50.

32. A liquid crystal polymer having the general formula:

$$Me_3SiO \left[ \begin{array}{c} R \\ | \\ Si-O \\ | \\ (CH_2)_nO-M \end{array} \right]_a \left[ \begin{array}{c} R^1 \\ | \\ Si-O \\ | \\ Me \end{array} \right]_b -SiMe_3 \quad (I)$$

wherein the mesogenic grouping M has a general structure

⬡P—(A)ₘ—⬡Q—Y
 |              |
 X              Z wherein the rings P and Q are selected from phenyl, trans-cyclohexyl, pyridyl, pyrimidinyl, dioxanyl, and bicyclo (2.2.2) octyl;
wherein a is a positive integer;
wherein n is an integer from 3 to 11;
wherein Y is $R_1$, $OR_1$, Hal, $CF_3$, $CO_2R_1$ or CN;
wherein X and Z are selected independently from H, Me and Hal;
wherein $R_1$ is an alkyl, open chain or branched, containing 1-12 carbon atoms;
wherein R = (CH₂)Me; and
wherein the group M is selected from structures (Me) to (Mh) as follows:

(Me) —⌬—COO—⌬—CN (Mf) —⌬—COO—⌬(Me)—CN (Mg) —⌬—COO—⌬—OMe

-continued

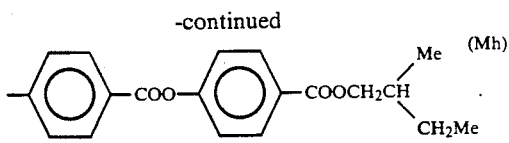

33. A liquid crystal polymer as claimed in claim 32, having an average degree of polymerization of 10 to 40.

34. A liquid crystal polymer having the general formula:

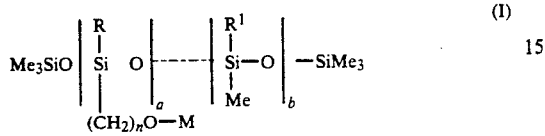

wherein the mesogenic grouping M has a general structure

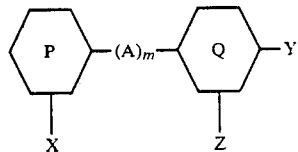

wherein the rings P and Q are selected from phenyl, trans-cyclohexyl, pyridyl, pyrimidinyl, dioxanyl, and bicyclo (2.2.2) octyl;
wherein $b/a < 3$ and $> 0$;
wherein Y is $R_1$, $OR_1$, Hal, $CF_3$, $CO_2R_1$ or CN;
wherein X and Z are selected independently from H, Me and Hal;
wherein n is an integer from 3 to 11;
wherein $R_1$ is alkyl, open chain or branched, containing 1-12 carbon atoms;
wherein R=Me and $R^1 = (CH_2)_3CN$; and
wherein the group M is selected from structures (Mi) to (Ml) as follows:

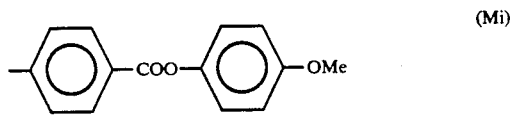

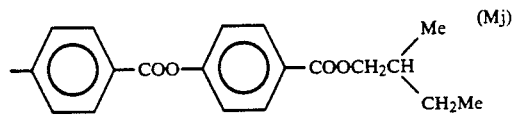

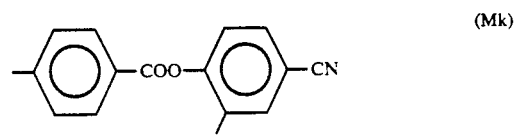

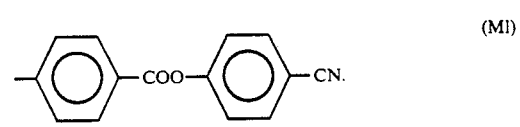

35. A liquid crystal polymer as claimed in claim 34, having an average degree of polymerization of 10 to 40.

36. A liquid crystal polymer as claimed in claim 35, wherein the ratio b/a is between 1.4:1 and 1:1.4.

* * * * *